US011080086B1

(12) United States Patent
Paluch et al.

(10) Patent No.: US 11,080,086 B1
(45) Date of Patent: Aug. 3, 2021

(54) REACTIVE TRANSACTION MANAGEMENT

(71) Applicant: Pivotal Software, Inc., San Francisco, CA (US)

(72) Inventors: Mark Paluch, Weinheim (DE); Joseph Benjamin Hale, Corte Madera, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 223 days.

(21) Appl. No.: 16/351,292

(22) Filed: Mar. 12, 2019

(51) Int. Cl.
| | |
|---|---|
| *G06F 9/46* | (2006.01) |
| *G06F 9/50* | (2006.01) |
| *G06F 16/18* | (2019.01) |
| *G06F 11/14* | (2006.01) |
| *G06F 16/23* | (2019.01) |
| *G06F 9/52* | (2006.01) |

(52) U.S. Cl.
CPC .............. *G06F 9/466* (2013.01); *G06F 9/467* (2013.01); *G06F 9/468* (2013.01); *G06F 9/5016* (2013.01); *G06F 9/5022* (2013.01); *G06F 11/1474* (2013.01); *G06F 16/1865* (2019.01); *G06F 16/2308* (2019.01); *G06F 9/528* (2013.01); *G06F 2221/0795* (2013.01)

(58) Field of Classification Search
None
See application file for complete search history.

(56) References Cited

U.S. PATENT DOCUMENTS

| | | | |
|---|---|---|---|
| 5,819,255 A | 10/1998 | Celis et al. | |
| 6,606,626 B1 | 8/2003 | Ponnekanti | |
| 7,139,749 B2 | 11/2006 | Bossman et al. | |
| 9,400,638 B2 | 7/2016 | Smet et al. | |
| 2012/0047495 A1 | 2/2012 | Meijer et al. | |
| 2012/0084749 A1 | 4/2012 | Gogh et al. | |
| 2015/0142501 A1* | 5/2015 | Nair ................. | G06Q 10/06316 705/7.26 |

OTHER PUBLICATIONS

Paluch, Mark, "Reactive Programming and Relational Databases", Dec. 7, 2018, Spring Blog. (Year: 2018).*

(Continued)

*Primary Examiner* — Qing Yuan Wu
(74) *Attorney, Agent, or Firm* — Fish & Richardson P.C.

(57) ABSTRACT

Methods, systems, and apparatus, including computer programs encoded on computer storage media, for implementing reactive transaction management. A method includes: receiving, by an application framework, a program that defines a transaction having a plurality of operations to one or more respective transactional resources; generating, by the application framework, a respective sequence of reactive operators for each transactional resource in the transaction; initiating each respective sequence of reactive operators, including: determining, by the application framework using a first thread, that one of the sequences has not completed; in response, relinquishing computing resources of the first thread; receiving an indication that all of the sequences of reactive operators have completed; determining that none of the sequences of reactive operators failed; and in response, committing the operations of the transaction in each of the one or more transactional resources.

27 Claims, 5 Drawing Sheets

(56) References Cited

OTHER PUBLICATIONS

Gomes, Ana Sofia, "Transaction in Dynamic Reactive Environments", Jan. 2015, Universidade Nova De Lisboa. (Year: 2015).*

Docs.spring.io [online] "23. Web Reactive Framework: Part V. The Web," retrieved on Mar. 26, 2019, retrieved from: https://docs.spring.io/spring-framework/docs/5.0.0.M1/spring-framework-reference/html/web-reactive.html, 5 pages.

Github.com [online] "High performance reactive Postgres Client written in Java," year 2019, [retrieved on Mar. 26, 2019], retrieved from: https://github.com/reactiverse/reactive-pg-client, 7 pages.

Jdhi.org [online] Jdhi 3 Developer Guide, dated Jan. 22, 2019 [retrieved on Mar. 26, 2019], retrieved from: http://jdbi.org/, 126 pages.

Maldini, "Reactor Netty," Asynchronous TCP, UDP and HTTP, dated Mar. 26, 2019, 9 pages.

Postgresql.org [online] Chapter 51. Frontend/Backend Protocol, dated Feb. 14, 2019 [retrieved on Mar. 26, 2019], retrieved from: https://www.postgresql.org/docs/9.6/protocol.html, 2 pages.

Projectreactor.io [online] Reactor Core 3.2.8.RELEASE, retrieved on Mar. 26, 2019, retrieved from: https://projectreactor.io/docs/core/release/api, 2 pages.

R2dbc.io [online] R2DBC: Clients, year 2018, [retrieved on Mar. 26, 2019], retrieved from: https://r2dbc.io/clients/, 4 pages.

* cited by examiner

REACTIVE TRANSACTION MANAGEMENT

BACKGROUND

This specification relates to managing transactions.

A transaction is an atomic unit of work having one or more operations. A transaction imposes, to a system executing the transaction, a requirement that all operations in the transaction are either all are executed, or none are executed. This is typically accomplished by rolling back pending changes if one or more operations fail.

A transaction may include operations that when executed, for example, modify records in a database. If all of the operations are successfully executed, then the system executing the transaction can commit the changes to the database, indicating that the transaction has been executed successfully. If one or more operations in the transaction are not successfully executed, e.g., the system executing the transaction raises an exception for one or more of the operations, then the effect of any successfully executed operation in the transaction is reverted—or "rolled back"—in the database. In effect, the database is returned to a point before the system initiated the transaction.

For example, a transaction to a database storing bank account information for a user may include operations to withdraw money from a user's checking account and deposit money into the user's savings account. The transaction is atomic because one operator executed alone would not have the net effect of transferring money from one account to another. Therefore, if one operation is not executed successfully, then the whole transaction fails and any pending changes to the database are rolled back.

A client application can treat a plurality of operations as a transaction. A user writing such a client application can designate the operations as belonging to a transaction in a number of ways, e.g., declaratively or programmatically. In the declarative approach, a user can explicitly designate a number of operations, e.g., operations in a function, as belonging to a particular transaction. For example, in some systems a user can include in the source code a direction that indicates that the plurality of operations should be treated as a transaction, e.g., by tagging source code representing the operations in a source code file with an annotation or a decorator, "@transaction." In the programmatic approach, the client application interacts with a system executing the operations using a transactional Application Program Interface (API). The client application can configure how the system generates transactions from the operations, or the system can associate a plurality of operations implicitly as a single transaction, e.g., by pre-determined low-level functionality.

Systems executing transactions often manage a large number, e.g., 100, 1000, 10,000, or more, of transactions between a plurality of interacting client applications and transactional resources. Because transactions are required to be performed atomically, the software of the client application blocks to wait for each operation in the transaction to finish executing. During these blocking operations, the application occupies at least one thread of the underlying computing environment allocated to execute an operation in the transaction while waiting for the operations of the transaction to complete. During this time, the client application typically does no actual work while blocked.

A common thread utilization strategy on multicore processors is to dedicate one core to each thread. When one thread is blocking, the utilization of the processor is hindered, making the number of threads supported by the computing environment a bottleneck that limits the number of transactions that can be performed concurrently.

SUMMARY

This specification describes using reactive operators to manage transactions. In this specification, reactive transaction management refers to managing the waiting and coordination activities of a transaction using reactive operators. This allows the system to manage transactions in a non-blocking, asynchronous manner. The system also manages transactions while allowing for flexible client application interaction with the system, using either a declarative or programmatic transaction management paradigm.

Particular embodiments of the subject matter described in this specification can be implemented so as to realize one or more of the following advantages. Reactive transaction management can be performed for client applications, because a reactive transaction management system can handle the waiting and coordination of a transaction in a non-blocking manner without violating the atomicity of the transaction. Additionally, the techniques described below allow users to easily declare which operations should be handled using reactive transaction management. Declarative designations of transactions are conceptually simple to use, therefore client applications can be written to be less complex over equivalent applications that handle designating transactions programmatically.

Transactions are managed reactively, in a push/pull model, wherein the system allocates computing resources according to how much data is currently available to the system and how much data the system can currently process.

Transaction metadata is information related to a transaction. Each operator that is upstream of a transaction metadata operator can access the transaction metadata. Therefore, each operation in a transaction can access information related to the transaction in a non-thread-bound way. Each operation in a transaction can be executed on separate threads while the system monitors the completion of all operations in a transaction before committing any changes to data.

Computing resources allocated to threads can be aggressively relinquished to prevent idle computing resources, because the system relinquishes resources without blocking before receiving an indication that all of the operations in a particular transaction have finished executing. The system can then reallocate relinquished computing resources to execute another operation, either related to a particular transaction or for another transaction altogether.

For systems allocating threads representing computing resources for one or more computer processing cores, the system can run the cores at full utilization, because the threads are non-blocking. The system can manage a large number of transactions concurrently, and can return data associated with the transactions in subsets of a pre-determined size, providing subsets when possible to the client application instead of blocking a thread until the entire transaction is complete.

The system can track the history of on-going transactions through transaction metadata. In systems where information about a transaction is bound to an executing thread, the system is not able to identify at a given moment which transactions are on-going and which have finished. The system can use the transaction metadata to improve how transactions are initiated, and also reduce how often the system has to check for the status of ongoing transactions.

Additionally, the system can handle a large number of concurrent threads, e.g., 1000, 50,000, or 65536 threads, without requiring the client application to make substantive decisions about how the threads are allocated.

The details of one or more embodiments of the subject matter of this specification are set forth in the accompanying drawings and the description below. Other features, aspects, and advantages of the subject matter will become apparent from the detailed description, the drawings, and the claims.

BRIEF DESCRIPTION OF THE DRAWINGS

Like reference numbers and designations in the various drawings indicate like elements.

DETAILED DESCRIPTION

Figure 1:
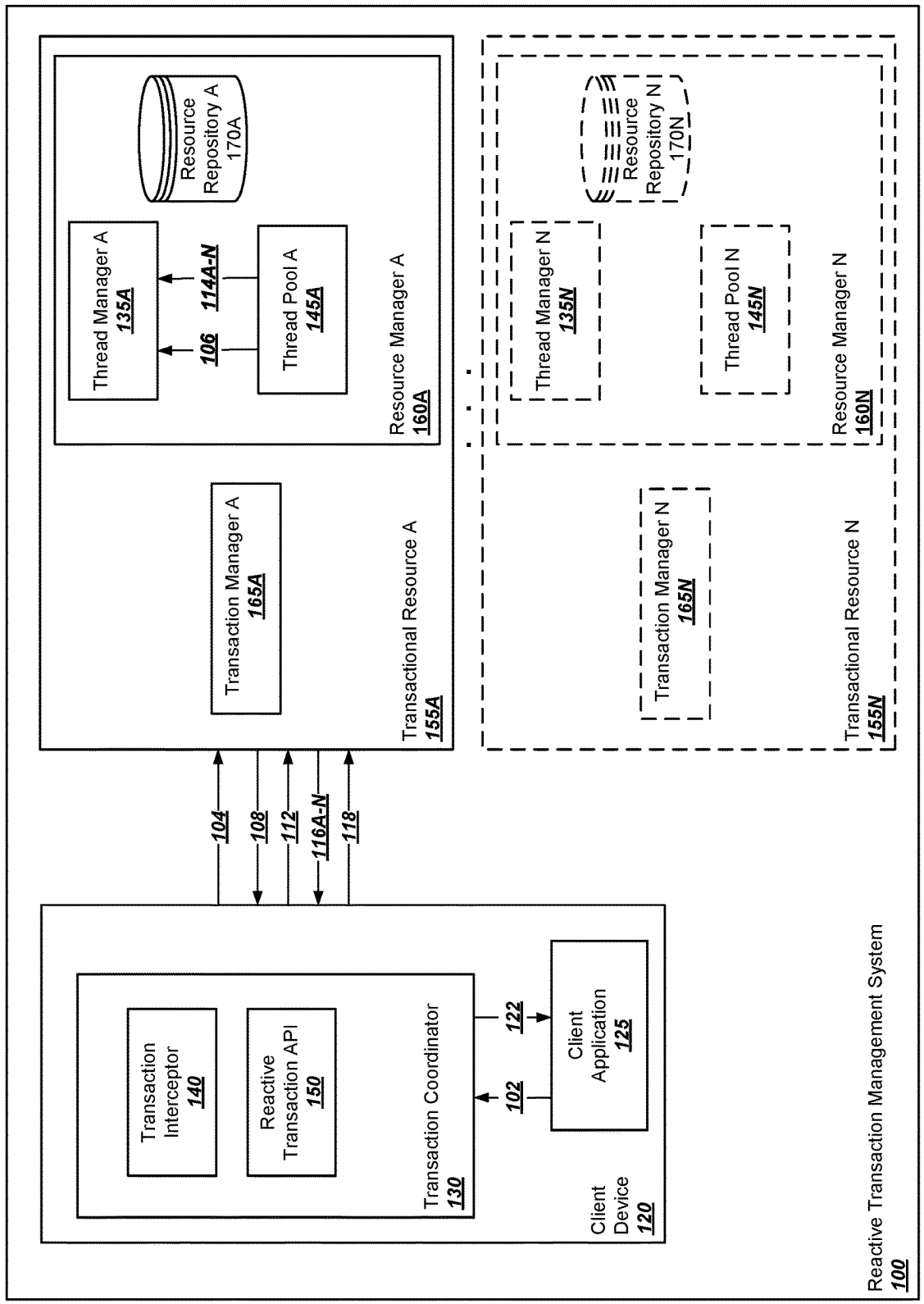
FIG. 1 is a diagram of a reactive transaction management system that illustrates a client device communicating with one or more transactional resources through a respective transaction manager.

This specification describes how a client application can execute multiple operations to manipulate data on one or more transactional resources as a series of atomic transactions, all executed in a non-blocking, asynchronous environment. A reactive transaction management system ("system") can manage a plurality of threads for executing transactions comprising multiple operations that the client application designates as being part of a respective transaction.

A discussion follows detailing an overview of reactive programming and exemplary implementations of a reactive transaction management system. The system can allow client applications to request a plurality of operations to be performed as one atomic unit or transaction, while managing computing resources in an asynchronously, push/pull environment, using reactive programming.

The reactive transaction management system is implemented using reactive operators. Programming with reactive operators is an asynchronous programming paradigm focused on data streams and the propagation of change. Therefore, in a reactive programming language it is possible to use simple types to express static data streams, e.g. arrays, or dynamic data streams, e.g. event emitters. A reactive program can include one or more subscribers, that when executed, subscribe to a respective one or more publishers. Upon subscription, the one or more publishers begin to emit data for use in the reactive programming program.

The semantics of reactive programs include a number of important features.

First, the statements of a reactive program define a sequence of reactive operators, which for brevity may be referred to in this specification as simply operators. A reactive program can also define a subscriber a publisher. The sequence of operators starts with a publisher and ends with a subscriber. The ordering of the sequence of operators in the program starting from the publisher and continuing to the subscriber will be referred to as the downstream order.

However, when the reactive program is actually executed, the operators are first executed in an upstream phase in upstream order, e.g., in a direction that is opposite to the downstream order defined by the program.

In the upstream phase, each operator in the program notifies the preceding operator in the order that it is ready to begin receiving data. Each operator can also optionally write to a subscription context (discussed below) in the upstream phase that propagates some data upstream during the upstream phase.

The downstream phase begins when the publisher receives a notification that the subsequent operator in the sequence is ready to begin receiving data. During the downstream phase, each operator receives events from a preceding operator in the sequence, processes the events, and provides the processed events to a subsequent operator in the sequence.

Importantly, the semantics of a reactive program imply non-blocking operation among operators in the sequence. In other words, operations of adjacent operators in the sequence can be, and indeed are expected to be, handled by different threads in the underlying execution system. The threads that implement the operators generally do not maintain any state between the operators.

A primary advantage of reactive programming paradigms is that the code is asynchronous and non-blocking. A single thread can be used to process multiple asynchronous sequences that execute at roughly the same time, meaning that execution often jumps from one thread to another. In other words, rather than blocking on a particular operation, the execution is allowed to switch to another active task using the same underlying resources and later come back to the previous process when the asynchronous processing has completed.

In a reactive programming paradigm, thread boundaries are no longer obeyed. In a blocking programming paradigm, each thread can store its own copy of a local variable. For example, in Java, threads can make use of ThreadLocal variables to store local copies of data.

In contrast, in a reactive programming system, the thread is not owned by the program currently being executed, and thus the thread can be switched to execute operators of other program instances at any time. Therefore, thread boundaries no longer provide stability for storing information locally, in association with a single thread.

To achieve this, subscription contexts are implemented to maintain data about which transaction an operator is involved in. This allows the system to coordinate transactions without maintaining thread boundaries. In this specification, subscription contexts are data structures that store one or more data values in association with a particular ordering of reactive operators defined by a client application. In some implementations, a subscription context is implemented as a mapping between keys and values, e.g., as a dictionary, a hash map, or an associative array, to name just a few examples. A detailed discussion of subscription contexts is provided in "Reactive Programming Subscription Context," U.S. Patent Application No. 62/682,629, filed on Jun. 8, 2018, which is incorporated herein by reference in its entirety.

The values written to the subscription context may only be available for upstream operators. In addition, in some implementations, the subscription contexts cannot be mutated during the downstream data flow. As will be discussed in detail, below, subscription contexts can store relevant information ("transaction metadata") about the transaction an operator is associated with. Once written, the transaction metadata is immutable during the life of the transaction, to guarantee that operators in the ordering are executed consistently and without alteration mid-transaction.

As another important feature, reactive programs facilitate handling backpressure caused by publishers emitting more data than subscribers can consume. For example, instead of a subscriber filling an ever-expanding buffer of data emitted by a publisher the subscriber is subscribed to, a reactive programming system can generally manage how much data is emitted from a publisher at once. The publisher can emit data as fast as a subscriber can consume, e.g., process, the data. Instead of filling a buffer for data waiting to be processed, the system can release computing resources instead of blocking while waiting to emit more data. Alternatively, the subscriber can dictate how fast the publisher upstream emits data, pausing and resuming data emission according to how the subscriber's processing capability.

FIG. 1 is a diagram of a reactive transaction management system 100 that illustrates a client device 120 communicating with one or more transactional resources 155A-N through a transaction coordinator 130 installed on the client device 120. Although illustrated as a separate system in FIG. 1, the transactional resources 155A-N can also be installed on the client device 120.

A transactional resource is a source of data that can be read or written to as one or more transactions by a client application 125 on the client device 120. A transactional resource can be any source of data that is required to handle multiple requests to read and write data, particularly from multiple client applications. For example, a transactional resource A 155A can be a relational database or a messaging system that stores messages and is accessed by multiple client applications on multiple devices, including the client application 125 on the client device 120. A transactional resource can also be a mail system, a cache, or a file system that stores and organizes files, e.g., documents.

The transactional resource A 155A can be one of multiple transactional resources 155A-N, and includes a resource repository A 170A, a resource manager A 160A that manages the resource repository A 170A, and a transaction manager A 165A that communicates with the transaction coordinator 130. As discussed in more detail below, the transaction manager A 165A can receive requests to execute operations, e.g., to read and write data, from the client application 125 to execute on the data stored on the resource repository A 170A.

The resource manager A 160A includes a thread manager A 135A and a thread pool 145A. The thread manager 135A manages computing resources for the transaction manager A 165A as one or more threads allocated to execute requests to execute operations on the one or more transactional resource 155A by the client application 125. This way, the transaction coordinator 130 can coordinate transactions from multiple client applications without having to deal with resource allocation to execute the requested operations.

If the transaction manager 165A executes requested operations as part of a transaction, then the transaction manager 165A can additionally send updated information about the transaction to a transaction interceptor 140 of the transaction coordinator 130. The transaction manager 165A can also receive an indication from the transaction interceptor 140 to commit or roll-back changes made to data in the resource repository A 170A.

In general, the transaction interceptor 140 can intercept requests from a client application 125. The client application 125 can send requests to execute operations that may include reading and writing to data stored by the transactional resources. The transaction interceptor 140 can generate and maintain information related to executing transactions, such as requests to execute operations by the client application 125 associated with an on-going transaction.

The transaction interceptor 140 can associate each transaction and each intercepted request that prompted the generation of the transaction with transaction metadata representing information about the respective transaction. The transaction interceptor 140 can associate each transaction with transaction metadata without binding a thread to any particular transaction. Under conventional transaction management systems, the bound thread risks remaining idle while waiting for the transaction interceptor 140 to verify that all operations in the transaction have executed.

The transaction interceptor 140 can verify that all operations for a particular transaction have been completed, and in response, can cause a transaction manager managing a respective transactional resource to commit the changes made to the transactional resource. If for some reason the transaction interceptor 140 determines not all operations were executed successfully, the transaction interceptor 140 can cause the respective transaction managers to roll back any pending changes caused by executing other operations successfully in the transaction.

The client device 120 can include the client application 125 and the transaction coordinator 130. The transaction coordinator 130 can communicate with the transactional resources 155A-N to intercept requests from the client application 125 to read or write data stored at one or more transactional resources 155A-N. The transaction coordinator 130 can include the transaction interceptor 140 and a reactive transaction application program interface ("API") 150.

The transaction coordinator 130 can receive and process requests by the client application 125 to execute operations defined by the reactive transaction API 150. For example, the reactive transaction API 150 can define an operation for writing new data to a resource repository of a transactional resource. The reactive transaction API 150 can also define routines for: establishing a connection with one of the transactional resources 155A-N and modifying data on one or of the transactional resources 155A-N.

The client application 125 can designate operations as belonging to a particular transaction, by designating the source code as associated with the operations. The client application 125 can designate the source code associated with the operations, for example, by using a special directive, e.g., a call to a decorator or other function defined in the reactive transaction API 150 to designate the source code as associated with the operations. As another example, the client application 125 can designate source code using syntax processed by a preprocessor prior to compiling the source code. In some implementations, the reactive transaction API 150 also defines routines for identifying that one or more operations in the client application 125 are part of a respective transaction, in a programmatic fashion.

Table 1 shows an example of source code in a client application designating two operations as part of a particular transaction.

TABLE 1

| | |
|---|---|
| 1 | @start_transaction_1 |
| 2 | write_data(transaction_resource_A, "Reactive"); |
| 3 | write_data(transaction_resource_A, "Programming"); |
| 4 | @end_transaction_1 |

Line 1 and line 4 in table 1 show example indications that the operations represented in the source code between lines 1 and 4 are part of a transaction named "transaction 1." Lines 2 and 3 are example calls to a function "write_data(•)" that could be defined in the reactive transaction API 150, which writes a value (the second parameter) to a particular transactional resource (the first parameter). Specifically, lines 2 and 3 of table 1 show calls to the write_data(•) function to write the strings "Reactive" and "Programming" to transactional resource A, respectively.

The transaction interceptor 140, in general, can intercept requests by the client application 125 to execute operations on the one or more transactional resources 155A-N. The transaction interceptor 140 can determine that intercepted requests are intended to be part of a transaction, and in response, register and store a new transaction. Alternatively, the transaction interceptor 140 can determine that intercepted requests are part of an on-going transaction, and update information about the on-going transaction to include executing the operations in the intercepted requests.

The transaction interceptor 140 can track the completion of requested operations in a transaction. Further, the transaction interceptor 140 can commit changes to the one or more transactional resources 155A-N, upon receiving an indication that all requested operations in a transaction have been completed successfully.

The thread manager for a resource manager can manage a corresponding thread pool of available computing resources to allocate computing resources for executing requests as operators in a pending transaction on the resource repository for the respective transactional resource. Allocating computing resources to a particular thread refers to designating some or all of a computing resource available to the system, e.g., one or more processors, processor cores, co-processors, or special-purpose processors, for the exclusive use of executing the operator for the particular thread. Relinquishing the computing resources for a thread refers to making computing resources that were previously allocated by the thread available again for use by the system. For example, if the thread manager for a resource manager allocated a processor core to a first thread, then that processor core is not available to the resource manager until the processor core is subsequently relinquished. Once the processor core is relinquished, the processor core can be used, for example, in allocating computing resources for a second thread.

As will be discussed in detail below, the resource manager for a transactional resource can read the transaction metadata for a pending transaction and cause the thread manager for the transactional resource to allocate and relinquish computing resources, as necessary, to execute the requested operations of a pending transaction in an asynchronous, non-blocking way.

The system 100 will be described by an example of the client application 125 sending requests to execute operations 102 to be executed on the transactional resource A 155A, where the requested operations 102 are part of a single transaction. The application 125 designates requests as part of a transaction in a declarative paradigm, e.g., through directives defined in the client application 125. In some implementations, the application 125 can identify requested operations as belonging to a single transaction in a programmatic paradigm, e.g., by calling respective routines defined in the reactive transaction API 150.

The transaction interceptor 140 can intercept the requests 102 by the client application 125 to the transactional resource A 155A. In some implementations, the client application 125 can send requests that are not designated by the client application 125 as belonging to a transaction. The transaction interceptor 140 can check that the intercepted requests are not intended to be part of a transaction, and in response, allow the transactional resources 155A-N to receive and execute the requests without additional processing.

After intercepting the requests 102 from the client application 125, the transaction interceptor 140 can generate a plurality of reactive programming operators and publishers using the reactive transaction API 150. Reactive programming operators, when executed, are configured to perform one of several tasks. These tasks are associated with the intercepted requests to execute operations on the one or more transactional resources 155A-N.

For example, one reactive programming operator is a transactional resource connection publisher that when executed, is configured to obtain a connection to the resource repository for a transactional resource from a resource manager of the transactional resource. The transactional resource connection publisher acts as the publisher, that when subscribed to by a subscriber, begins to emit data. The data emitted from the transactional resource connection publisher is data stored at the respective transactional resource for the transactional resource connection publisher. The data emitted is passed to other reactive programming operators in the downstream flow to the subscription operator that subscribed to the transactional resource connection publisher.

Another reactive programming operator is a transaction metadata operator, which when executed is configured to populate the subscription context of a particular subscriber with the transaction metadata of a particular transaction. The transaction metadata, as discussed below, includes data the transaction interceptor 140 can access to manage on-going transactions without binding a thread to any particular transaction, which would otherwise result in blocking conditions.

Reactive programming operators can also include any operator that when executed, is configured to execute an operation that is requested by the client application 125 to be executed on the one or more transactional resources 155A-N. These operators include operators, that when executed are configured to modify or read data on the one or more transactional resources 155A-N.

After intercepting the requests 102, the transaction interceptor 140 can determine that the requests 102 are associated with a new transaction, and in response, can register a new transaction for the requests. The transaction interceptor 140 can track multiple registered transactions, both on-going and completed, across the system 100.

The transaction interceptor 140 may intercept requests to execute operations that are designated as belonging to a transaction that is already on-going. In some implementations, the transaction interceptor 140 can determine that the requested operations 102 are part of previously registered and on-going transaction, and in response, add the transaction metadata of the on-going transaction to the subscription context for the corresponding operators for the requested operations 102. The added operators are a part of a transaction nested in the transaction represented by the transaction metadata. If execution of the operators in the original transaction is suspended, e.g., because execution is waiting on data to proceed, the resource manager for the transactional resource that received the nested operators can allocate threads to execute the nested operators, instead of blocking. Alternatively, in some implementations, the transaction interceptor 140 can raise an exception in response to determining that the requested operations 102 are part of a previously registered and on-going transaction, instead of generating operators for the requested operations 102 and updating the subscription context for the generated operators.

For a new transaction, the transaction interceptor 140 can generate: a transactional resource connection publisher and respective operators that when executed are configured to perform the requested operations 102. The transaction interceptor 140 can also generate a transaction metadata operator for writing in the transaction metadata of the newly registered transaction to the subscription context. The client application 125 defines the subscriber with a subscription operator that subscribes to the transactional resource connection publisher.

In this specification, after the respective generated reactive programming operators are generated by the transaction interceptor 140 for a new transaction, for brevity the transaction as a whole can be said to have the generated operators. This terminology is short-hand that means the operators belong to one or more reactive sequences for one or more respective transactional resources.

The transaction interceptor 140 can obtain information from the client application 125 to properly configure the generated reactive programming operators. The transaction interceptor 140 can populate a subscription context of the subscriber defined with the subscription operator with the transaction metadata for the transaction.

The transaction interceptor 140 can obtain data defining the transaction metadata, such as a label for the transaction, from the client application 125 as part of data intercepted along with the intercepted requests 102. In some implementations, parameters for the reactive programming operators and information for the transaction metadata can be defined by the client application 125 globally across all transactions, or can be supplied by the transaction coordinator 130. For example, the transaction interceptor 140 can determine which transactional resource should be associated with the generated transactional resource connection publisher, and can also determine parameters for the operators generated to execute the intercepted requests 102, e.g., query parameters for a generated query operator to read data, or a parameter representing the value a generated write operator should write to modify data on a transactional resource.

The transaction interceptor 140 can generate transaction metadata defining information for the transaction for the requested operations 102. The transaction metadata can include several pieces of information, including a label for the transaction, what computing resources are currently allocated to respective reactive programming operators associated with the transaction ("synchronized" transactions, discussed below), which transactional resources are accessed during a transaction, and restore points that a transaction can refer back to if a transaction fails after a restore point is established.

After generating the reactive programming operators, as discussed above, the transaction interceptor 140 can evaluate the reactive programming operators in the upstream subscription flow ordering until the transaction interceptor 140 evaluates a transactional resource connection publisher, e.g., the transactional resource connection publisher for transactional resource A 155A. This evaluation process begins when the subscriber for the client application 125 subscribes to the transactional resource connection publisher. The transaction interceptor 140 can send the generated transactional resource connection publisher to the transaction manager A 165A, and in response, the thread manager 135A can allocate a first thread 104 from the thread pool 145A to execute the transactional resource connection publisher. A detailed description of the upstream subscription flow and downstream data flow for an ordering of reactive programming operators is discussed, below.

The resource manager A 160A can execute the transactional resource connection publisher on the first thread 106 to request a connection 104 to the transactional resource A 155A. Because the transactional resource connection publisher is upstream to the subscriber defined by the subscription operator in the reactive programming operator ordering, the resource manager A 160A and the transaction interceptor 140 can read the transaction metadata in the subscription context.

The transaction interceptor 140 can use the transaction metadata to identify which transactional resource 155A-N should be sent the request to connect 104. The transaction interceptor 140 can also provide the transaction manager A 160A with information in the transaction metadata about the transaction associated with the transactional resource connection publisher. As discussed below, the transaction manager A 160A can use the transaction metadata for the transaction to monitor pending modifications to data in the resource repository A 170A.

The transaction manager A 165A can pass the request to connect 104 to the resource manager A 160A. In response and after some period of time, the resource manager A 160A can establish a connection between the transactional resource A 155A and the transaction interceptor 140. The transaction manager A 165A can log an indication 108 of an established connection associated with the transaction, and can send the indication 108 to the transaction interceptor 140. However, before the transaction interceptor 140 receives the indication 108, the thread manager 135 can relinquish computing resources for the first thread 104.

The transaction interceptor 140 can execute the generated reactive operators for the operations in the intercepted requests 102 by sending the operators 112 to the transactional resource A 155A. The transaction manager A 165A can receive the operators 112 and forward the operators 112 to the resource manager A 160A. In response and after some period of time, the resource manager A 160A can execute the operators 112.

Specifically, after the transaction interceptor 140 receives the indication 108 that a connection has been established with the transactional resource A 155A, the transaction interceptor 140 sends the operators 112 to the transaction manager A 165A, and in response, the thread manager 135A can allocate a plurality of threads 114A-N from the thread pool 145 to execute the operators 112.

The resource manager A 160A may not execute every operation requested at the same time. Therefore, as operations are executed, the transaction manager A 165A can log an indication of an executed operation. The transaction manager A 165A can send indications of executed operators 116A-N to the transaction interceptor 140, as the transaction manager A 165A logs each indication 116A-N. However, before the transaction interceptor 140 receives the indications of executed operators 116A-N, the thread manager 135 can relinquish computing resources for the plurality of threads 114A-N. The transaction manager A 165A can therefore keep track of what operators 112 have been executed on the transactional resource A 155A, and which operators have not been executed.

The transaction interceptor 140 can receive the indications of executed operators 116A-N from the transaction manager A and can determine that a transaction is still pending. Further, because the transaction metadata for the executed operator is available for each operator regardless of which thread in the plurality of threads 114A-N is allocated to the operator, the transaction interceptor 140 can determine to which transaction the operator belongs to. After each received indication 116A-N, the transaction interceptor 140 can update information for the registered transaction associated with the executed operators, using the transaction metadata associated with the operator.

As discussed above, the transaction interceptor 140 can initially register a new transaction using information from the transaction metadata for that transaction. The transaction interceptor 140 can then update which operations for a transaction have successfully executed, and which are still pending, based on the indications received from the transaction manager A 165A.

After receiving an indication of an executed operation, the transaction interceptor 140 can determine that the transaction associated with the executed operation is still pending. For example, the transaction interceptor 140 can read the information associated with the registered transaction and determines that the transaction interceptor 140 has not received an indication from the transaction manager A 165A that every operation associated with the transaction has been executed.

If the transaction interceptor 140 updates information associated with the registered transaction and determines that the every operator associated with the transaction has executed, then the transaction interceptor 140 can send an indication to commit changes 118 to data stored on resource repository A 170A caused as a result of the resource manager A 160A executing the requested operators 112.

By waiting until the transaction interceptor 140 has received an indication that all requested operations for a transaction have completed, the transaction interceptor 140 polices the atomicity of the transactions, because changes made to the transactional resources 155A-N are only committed after the transaction interceptor 140 determines that all operators for a transaction have executed successfully.

The transaction interceptor 140 can manage information associated with on-going and completed transactions. In some implementations, the transaction interceptor 140 can update the information associated with the registered transaction as status updates of an operation associated with the requests to execute the operators 112. The status of an operation can reflect whether the operation was successfully executed or not. For example, if a predetermined period of time from sending the requests to execute the operators 112 lapses, the transaction interceptor 140 can update the status of the operation as "failed," indicating that the operation has timed-out. In that case, the transaction interceptor 140 would not send the indication to commit changes 118 to the transactional resource A 155A. Instead, the transaction interceptor 140 can indicate to the transactional resource A 155A to revert changes made by executing the other operations in the transaction successfully.

The transaction interceptor 140 can provide the client application 125 with information about the status of an on-going transaction. In some implementations, the transaction manager for a transactional resource can send indications that a requested operation was not successfully executed. For example, during execution of the operation the resource manager for the transactional resource can raise an exception that the operation could not be executed, or raise an exception that the executing the operation resulted in corrupted data. The transaction manager for the transactional resource can send an indication that the operation caused the resource manager for the transactional resource to raise an exception and therefore should be updated as "failed."

The client application can request for operations to be performed across multiple transactional resources. In some implementations, a transaction can include operators that when executed perform operations on different transactional resources. In this specification, multiple transactional resources are considered "synchronized" to a transaction. For example, a transaction can include multiple transactional resource connection publishers, each to a different transactional resource. In those implementations, when the transaction interceptor 140 generates reactive programming operators from the intercepted requests, the generated operators form multiple reactive programming operator orderings, each ordering including a respective subscription operator that defines a subscriber, as well as a respective transactional resource connection publisher.

For example, if the client application 125 sends requests to perform operations on both transactional resource A 155A and transactional resource N 155N, then the transaction interceptor 140 can intercept the requests and generate reactive programming operators for each request as part of a new transaction, as described above. These reactive programming operators can include first and second transactional resource connection publishers that when executed establish a connection to transactional resource A 155A and transactional resource N 155N, respectively. The reactive programming operators can also include first and second subscription operators that define subscribers for subscribing to the transactional resource connection publishers for the transactional resource A 155A and the transactional resource N 155N, respectively.

The transactional resource connection publisher for the transactional resource A 155A, its respective subscription operator, and any operators that when executed are configured to execute operations on the transactional resource A 155A form one ordering, while the transactional resource connection publisher for the transactional resource N 155N, its respective subscription operator, and any operators that when executed are configured to execute operations on the transactional resource N 155N form another ordering.

For each reactive programming operator ordering, the thread manager for the respective synchronized transactional resource can allocate threads from the respective thread pool to execute each transactional resource connection publisher. As described above, the respective thread manager can relinquish the computing resources for each respective thread before the transaction interceptor 140 receives indications from the corresponding transaction managers, i.e., transaction manager A 165A and transaction manager N 165N in this example, indicating that connections to the transactional resources have been established.

While one or more transactions are pending, the transaction interceptor 140 can intercept additional requests from the client application 125. In some implementations, the transaction interceptor 140 can determine that the additional requests are designated as belonging to a currently pending transaction. In response, the transaction interceptor 140 can reuse the transaction metadata for one or more transactions designated by the additional intercepted requests, and generate respective reactive programming operators for the operations associated with the additional requests.

The transaction interceptor 140 can proceed to send requests to execute the generated operators for the additional intercepted requests, as discussed above. The transaction interceptor 140 can receive indications of executed operations from the transactional resources synchronized to the transaction. Once the transaction interceptor 140 determines that every operator associated with the transaction has been executed, the transaction interceptor 140 can send an indication to commit the changes made during the transaction, to each synchronized transactional resource.

A transactional resource can send an indication to the transaction interceptor 140 that executing a successful operator is not successful. For example, the resource manager for the transaction may not be able to execute the operator, or some issue may arise during execution that corrupted data associated with the requested operator, causing an exception to be raised. In these situations, the transaction manager for the transactional resource can send an indication to the transaction interceptor 140 that the operator has failed to execute, and optionally provide further information about the failure.

The transaction interceptor 140 can perform error-handling when one or more operations in a transaction fail to execute. In some implementations, if the transaction interceptor 140 receives at least one indication from a transaction manager that an operator failed to execute, the transaction interceptor 140 will not send an indication to the synchronized transactional resources of a transaction to commit any changes. Instead, the transaction interceptor 140 can send an indication to revert any pending changes caused by successfully executing other operators on the synchronized transactional resources. In effect, the transaction interceptor 140 can cause the synchronized transactional resources for a transaction to roll-back any pending changes, to revert the transactional resources to a state prior to the client application 125 sending the requests to execute the operations.

The transaction interceptor 140, in addition to sending indications to the synchronized transactional resources to roll back pending changes as a result of receiving an indication that at least one of the operators for a transaction failed to execute, can also send to the client application 125 an indication that the transaction was not successfully completed. The transaction interceptor 140 can also send the client application 125 information detailing which operations failed, based on the transaction metadata for the transaction.

The transaction metadata for a transaction can store information relating to a restore point for the transaction. If, for example, a particular transaction includes a large number of operations, such that failure and reverting back pending changes would be very time-consuming and computationally inefficient, the client application 125 can specify restore points with the requests to execute the operations sent to the transaction interceptor 140.

This has the effect of breaking one transaction down into multiple sub-transactions. The client application 125 can indicate that after execution of a certain number of operations, the transaction interceptor 140 should determine if all the operations up to that point have been executed successfully, and commit the changes to the synchronized transactional resources. The committed changes represent a restore point, such that if subsequent operations in a transaction fail, the transaction interceptor 140 can roll back to the latest restore point for a transaction, instead of rolling back all changes. The transaction interceptor 140 can proceed with the next sub-transaction in the transaction, and can create an additional restore point for operations executed in the next sub-transaction, or commit all the changes if the transaction interceptor 140 determines that all operations in the transaction were successfully executed.

Figure 2:
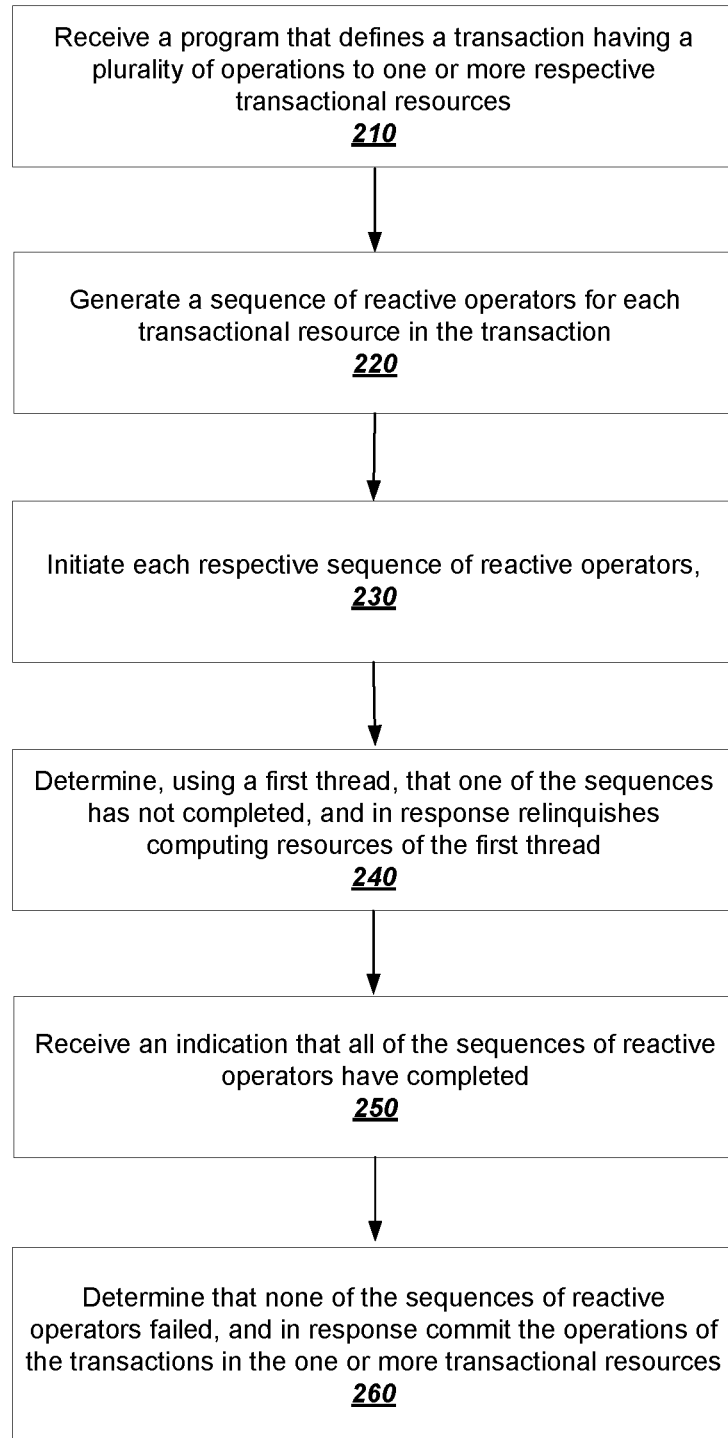
FIG. 2 is a flowchart for an example process for executing a plurality of operations as a transaction, using a reactive transaction management system.

FIG. 2 is a flowchart for an example process for executing a plurality of operations as a transaction, using a reactive transaction management system. For convenience, the process in FIG. 2 will be described as being performed by a system of one or more computers located in one or more locations. For example, a reactive transaction management system, e.g., the reactive transaction management system 100 of FIG. 1, appropriately programmed in accordance with this specification, can perform the process in FIG. 2. Additional detail for implementing a system that can perform the process in FIG. 2 can be found in the description of FIG. 1, above.

The system receives a program that defines a transaction having a plurality of operations to one or more respective transactional resources (210). As discussed above with reference to FIG. 1, the program can be an application that specifies operations for a transaction in either declaratively by special directives, or programmatically by a callback function defined in an API, such as the reactive transaction API.

The system generates a sequence of reactive operators for each transactional resource in the transaction (220). As discussed above with respect to FIG. 1, the system can generate corresponding reactive programming operators to execute the operations that the transaction interceptor intercepts from the client application.

The system initiates each respective sequence of reactive operators (230). Initiating a sequence of reactive operators includes: storing transaction metadata in a subscription context for the sequence; evaluating the sequence of reactive operators in an upstream subscription flow ordering until evaluating an operator that connects to the transactional resource, and passing the subscription context for the sequence to each subsequent operator in the sequence, and evaluating the sequence of reactive operators in a downstream data flow ordering when the operator that connects to the transactional resource begins receiving data.

Because the system stores the transaction metadata in the subscription context for the sequence of operators, information about the transaction metadata is available for each operator independently across the threads the system allocates to execute the operators on. This means that the system can implement the transaction management in a non-blocking way, while still tracking the progress of each transaction through operators for the transaction executing on different threads.

The system does not need to reserve computing resources for monitoring whether on-going transactions have completed successfully or not. Rather, the system can allocate computing resources as threads to execute an operator, e.g., establish a connection with a transactional resource, and can relinquish the computing resources before receiving an indication that the operator has executed successfully.

The system can receive indications from the respective transaction manager for the transactional resources, and can update the status of each registered transaction by the indications the system receives. The system does not need to maintain the thread originally allocated to execute the operator, because the system can read the transaction metadata for the transaction the operator is in.

The intercepted operations can be operations to be executed on one or more transactional resources, therefore one or more sequences of reactive operators will be generated, with each sequence having operators associated with a particular transactional resource. As discussed below, each sequence of reactive operators will define an ordering, which includes an upstream subscription ordering and a downstream data flow.

The system determines, using a first thread, that one of the sequences has not completed, and in response relinquishes computing resources of the first thread (240). The system relinquishes computing resources after determining that a sequence has not completed, instead of blocking and waiting for the sequence of operators to finish executing. In this way, the system can maintain maximum uptime of computing resources, for example by allocating the newly relinquished resources to determine whether another sequence of operators has finished executing.

The system receives an indication that all of the sequences of reactive operators have completed (250). As discussed above with respect to FIG. 1, the transaction manager for a transactional resource can send indications when operators have executed on the transactional resource. In some implementations, the transaction manager can send indications to the transaction interceptor as each operator on the transactional resource is executed, or the transaction manager can send one indication when every operator in a sequence has executed.

The system determines that none of the sequences of reactive operators failed, and in response commits the operations of the transactions in the one or more transactional resources (260). As discussed above with respect to FIG. 1, the system only commits changes to the transactional resources after determining that every operator was successful. This way, the system maintains the property of atomicity for the executed transaction. If, for some reason, such as in the examples discussed above, the system determines that not every operator executed successfully, the system can cause the transactional resources to roll-back changes as a result of the successfully executed operators.

Next, a discussion of the reactive programming operator ordering and the upstream subscription ordering for the reactive programming operators is presented. As discussed above, a reactive transaction management system can generate a plurality of reactive programming operators and publishers. Together, the plurality of reactive programming operators and publishers define an ordering, which the system can iterate over twice in opposite directions.

If multiple transactional resource connection resources are meant to be synchronized, then the plurality of reactive programming operators can define multiple orderings, each corresponding to a respective transactional resource connection publisher for a synchronized transactional resource. The explanation below describes a single reactive programming operator ordering, but it is understood that the details below apply the same to multiple orderings.

An upstream ordering of the operators from a subscriber to a publisher represents a subscription flow through the operators for a particular subscriber. A downstream ordering of operators represents a data flow through the operators that propagates data from a particular publisher to a particular subscriber.

The reactive transaction management system can provide the transactional resource connection publisher to be the publisher in the ordering. The subscriber for an ordering that consumes the final form of the data processed by the operators in the ordering is always defined in the client application. The system generally executes the upstream subscription flow first, followed by the downstream data flow.

Figure 3A:
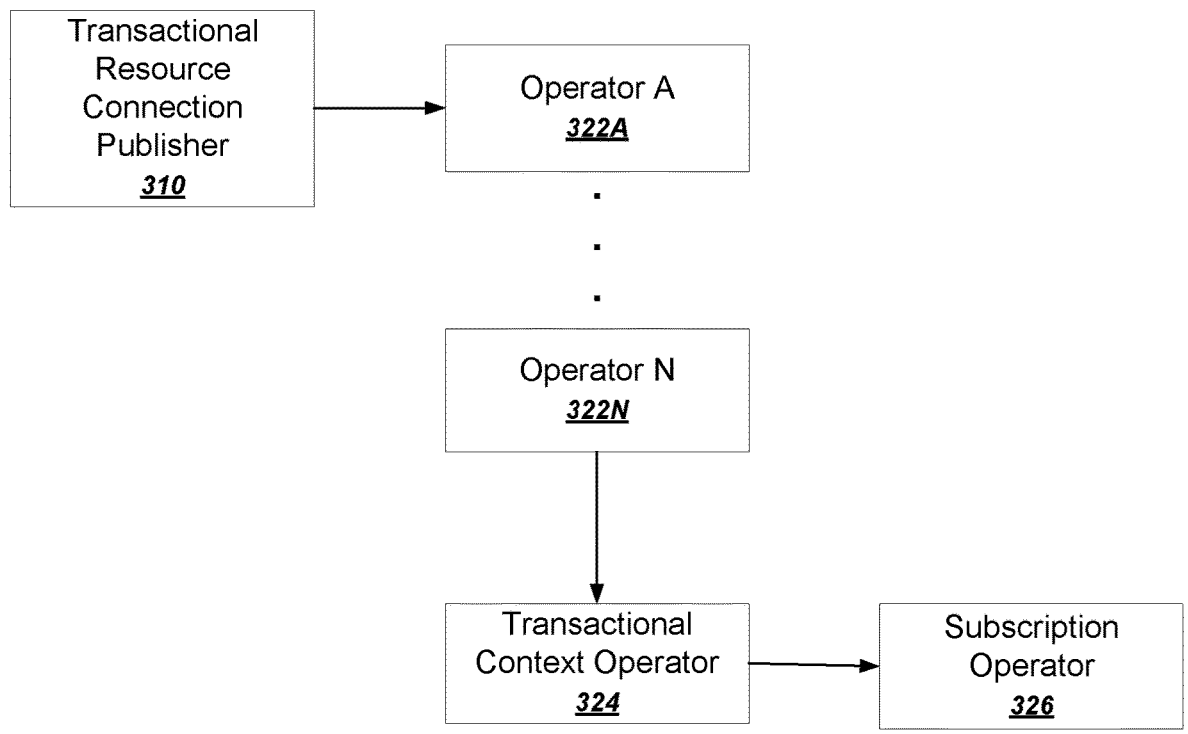
FIG. 3A is a diagram that illustrates a reactive programming operator ordering.

FIG. 3A is a diagram that illustrates reactive programming operators generated by a reactive transaction management system, defining an ordering. The ordering shown in FIG. 3A can be defined by the system, but generally follows a sequential order of operators needed to read or write data on a transactional resource synchronized to the transaction for the ordering of operators. Specifically, a transactional resource connection publisher 310 is ordered before reactive programming operators A-N 322A-N, representing the requested operations the transaction interceptor intercepts from a client application. The reactive programming operators 322A-N are ordered before a transaction metadata operator 324. The transactional resource connection publisher 310 is the first reactive programming operator in the ordering, and a subscription operator 326 is the last operator in the ordering.

For example, in response to intercepting requests to query data from a transactional resource, e.g., a relational database, the transaction interceptor can generate: a transactional resource connection publisher that when executed is configured to establish a connection with the relational database, as well as multiple reactive programming operators that when executed are configured to query the relational database as indicated in the intercepted requests. If the intercepted requests include requests to write data to the relational database, then the generated reactive programming operators can also include operators that when executed are configured to write data to the relational database as indicated in the intercepted requests.

Other examples of operators that could be generated in the reactive programming operators A-N 322 A-N include: a query result operator that when executed is configured to return query results of a query to the client application; and a query optimization operator that when executed is configured to optimize a query before executing the query on a transactional resource.

The transaction metadata operator 324 writes transaction metadata for the transaction in the subscriber context for the subscriber generated by the subscription operator 326. As mentioned above, the transaction metadata can contain information related to the transaction, and is only available for upstream operators. The transaction metadata operator 324 can write a transaction metadata for the transaction based on information received from the client application, the system, or both.

The transactional resource connection publisher 310 acts as the publisher in the ordering shown in FIG. 3A. The transactional resource connection publisher 310, when executed by the system, can establish a connection to a synchronized transactional resource and begin to emit data from the synchronized transactional resource. The transactional resource connection publisher 310 only begins to emit data after receiving a subscription request from a subscriber. The subscription operator 326 defines the subscriber for the transactional resource connection publisher 310. The subscription operator 326 starts the entire upstream subscription process and defines a receiving operator for the downstream data flow process.

Figure 3B:
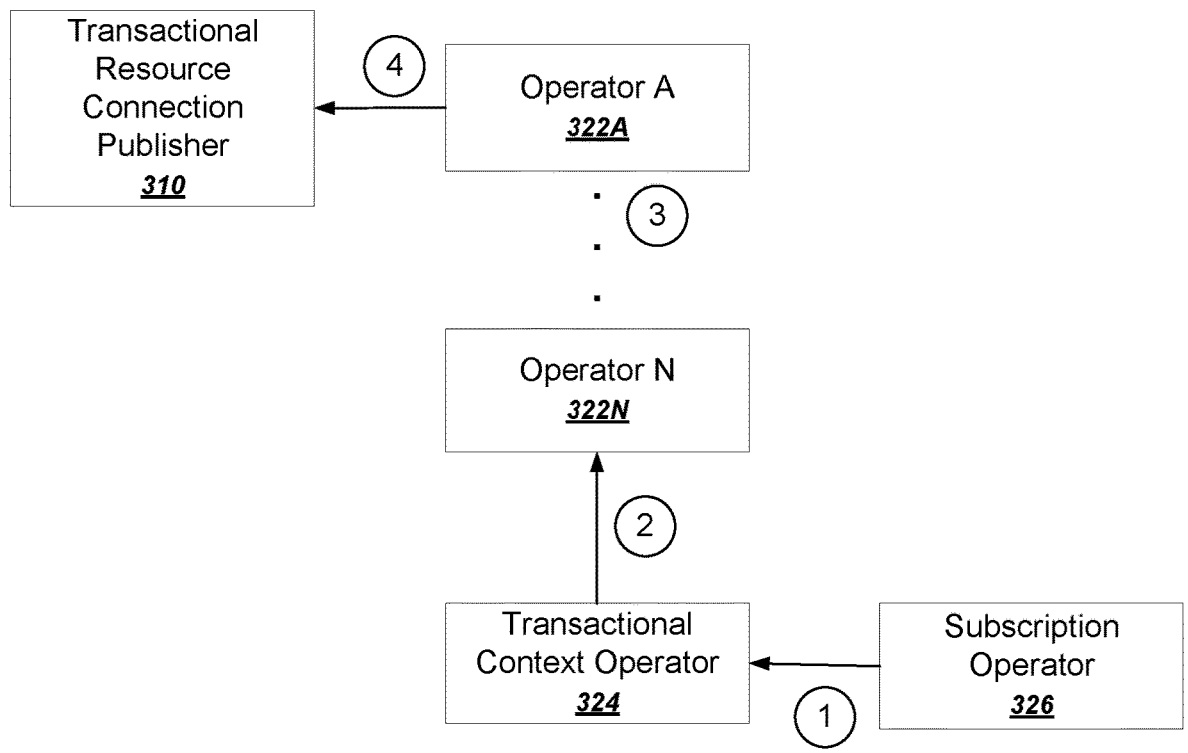
FIG. 3B is a diagram that illustrates the upstream subscription flow of a reactive programming ordering.

FIG. 3B is a diagram that illustrates the upstream subscription flow of a reactive programming operator ordering. The system evaluates the reactive programming operators in the upstream subscription flow ordering, beginning with the subscription operator 326. The system evaluates the ordering for each reactive programming operator in the upstream subscription flow until the transactional resource connection publisher 310 is evaluated.

The system follows the upstream ordering to perform a subscription operation for each operator in the upstream subscription flow. Thus, the system performs the following subscription operations in the upstream ordering. First, the system performs the transaction metadata operation 324 that writes the transaction metadata for the transaction to the subscription context. Then, the system subscribes the transaction metadata operator to the operator N 322N. Subsequent propagation of subscription operators upstream all the way to the transactional resource connection publisher 310 makes the subscription context available to all upstream operators.

Figure 3C:
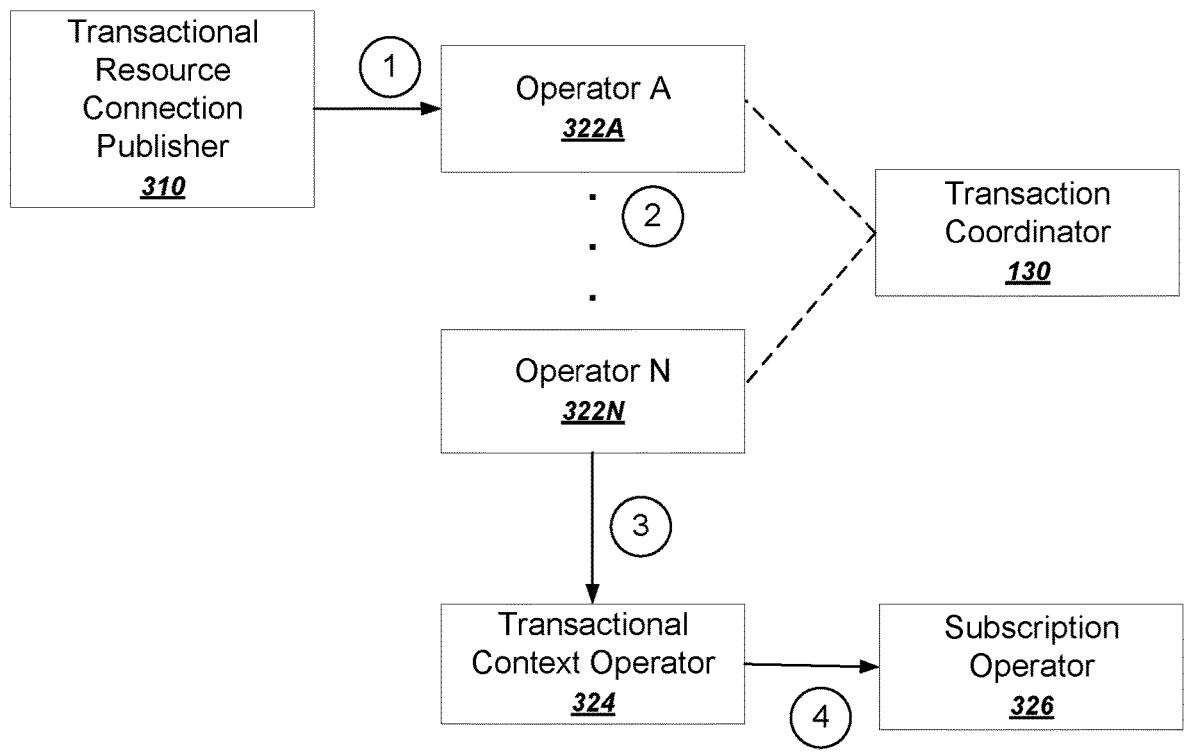
FIG. 3C illustrates the downstream data flow of a reactive programming ordering.

FIG. 3C illustrates the downstream data flow of a reactive programming ordering. The system first executes the transactional resource connection publisher 310, which begins to emit one or more data items from the synchronized transactional resource. The system then executes the operator A 322A, followed by any operators between the operator A 322A and the operator N 322N, followed by the operator N 322N, followed by the transaction metadata operator 324. As described above, because reactive programming is non-blocking, different threads of the underlying computing system can execute different respective operators.

For any operator A-N 322A-N, the transaction coordinator 130 can read the transaction metadata for the transaction the operators A-N 322A-N are a part of. This is because all the operators upstream of the transaction metadata operator 324 can access the transaction metadata in the subscription context regardless of which threads executed the transaction metadata operator 324 and which threads executed the other operators, including the transactional resource connection publisher 310 and the operators A-N 322A-N. Finally, the system provides the processed data items to the subscriber defined by the subscription operator 326. From the subscriber, the system can provide the processed data to the client application, as requested.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nontransitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a backend component, e.g., as a data server, or that includes a middleware component, e.g., an application server, or that includes a frontend component, e.g., a client computer having a graphical user interface, a web browser, or an app through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising: receiving, by an application framework, a program that defines a transaction having a plurality of operations to one or more respective transactional resources; generating, by the application framework, a respective sequence of reactive operators for each transactional resource in the transaction; initiating each respective sequence of reactive operators, including: storing transaction metadata in a subscription context for the sequence, evaluating the sequence of reactive operators in an upstream subscription flow ordering until evaluating an operator that connects to the transactional resource, and passing the subscription context for the sequence to each subsequent operator in the sequence, and evaluating the sequence of reactive operators in a downstream data flow ordering when the operator that connects to the transactional resource begins receiving data; determining, by the application framework using a first thread, that one of the sequences has not completed; in response, relinquishing computing resources of the first thread; receiving an indication that all of the sequences of reactive operators have completed; determining that none of the sequences of reactive operators failed; and in response, committing the operations of the transaction in each of the one or more transactional resources.

Embodiment 2 is the method of embodiment 1, further comprising: determining that at least one of the sequences of reactive operators failed; and in response, reverting the operations of the transaction in each of the one or more transactional resources.

Embodiment 3 is the method of any one of the embodiments 1 through 2, wherein the program includes a special directive that directs the system to reactive transaction management for the operations of the transaction.

Embodiment 4 is the method of any one of the embodiments 1 through 3, wherein the program that defines a transaction having a plurality of operations to one or more respective transactional resources comprises a reactive operator defining the transaction.

Embodiment 5 is the method of any one of the embodiments 1 through 4, wherein the program defines the operations of the transaction using a callback function defined in the application framework, wherein executing the callback function identifies the transaction having the operations.

Embodiment 6 is the method of any one of the embodiments 1 through 5, wherein the transaction metadata is immutable in the downstream data flow.

Embodiment 7 is the method of any one of the embodiments 1 through 6, wherein the first transaction resource is a system supporting transactions.

Embodiment 8 is the method of any one of the embodiments 1 through 7, wherein the first transactional resource is a relational database.

Embodiment 9 is the method of any one of the embodiments 1 through 8, wherein the first transactional resource is a messaging system.

Embodiment 10 is the method of any one of the embodiments 1 through 9, wherein determining that none of the sequences of reactive operators failed comprises receiving an indication, from each transactional resource in the one or more transactional resources, that operations for the transactional resource executed successfully.

Embodiment 11 is the method of any one of the embodiments 1 through 10, wherein the system is configured to concurrently maintain a predetermined maximum number of threads, each thread associated with computing resources from the one or more computers.

Embodiment 12 is a system comprising: one or more computers and one or more storage devices storing instructions that are operable, when executed by the one or more computers, to cause the one or more computers to perform the method of any one of claims 1 to 11.

Embodiment 13 is a computer storage medium encoded with a computer program, the program comprising instructions that are operable, when executed by data processing apparatus, to cause the data processing apparatus to perform the method of any one of claims 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   receiving, by an application framework, a program that defines a transaction having a plurality of operations to one or more respective transactional resources;
   generating, by the application framework, a respective sequence of reactive operators for each transactional resource in the transaction;
   initiating each respective sequence of reactive operators, including:
      storing transaction metadata in a subscription context for the sequence,
      evaluating the sequence of reactive operators in an upstream subscription flow ordering until evaluating an operator that connects to the transactional resource, and passing the subscription context for the sequence to each subsequent operator in the sequence, and
      evaluating the sequence of reactive operators in a downstream data flow ordering when the operator that connects to the transactional resource begins receiving data;
   determining, by the application framework using a first thread, that one of the sequences has not completed;
   in response to the determining that one of the sequences has not completed, relinquishing computing resources of the first thread;
   receiving an indication that all of the sequences of reactive operators have completed;
   determining whether none of the sequences of reactive operators failed; and
   in response to determining that none of the sequences of reactive operators failed, committing the operations of the transaction in each of the one or more transactional resources.

2. The system of claim 1, the operations further comprising:
   in response to determining that at least one of the sequences of reactive operators failed, reverting the operations of the transaction in each of the one or more transactional resources.

3. The system of claim 1, wherein the program includes a special directive that directs the system to reactive transaction management for the operations of the transaction.

4. The system of claim 1, wherein the program that defines a transaction having a plurality of operations to one or more respective transactional resources comprises a reactive operator defining the transaction.

5. The system of claim 1, wherein the program defines the operations of the transaction using a callback function defined in the application framework, wherein executing the callback function identifies the transaction having the operations.

6. The system of claim 1, wherein the transaction metadata is immutable in the downstream data flow.

7. The system of claim 1, wherein the first transaction resource is a system supporting transactions.

8. The system of claim 7, wherein the first transactional resource is a relational database.

9. The system of claim 7, wherein the first transactional resource is a messaging system.

10. The system of claim 1, wherein determining that none of the sequences of reactive operators failed comprises receiving an indication, from each transactional resource in the one or more transactional resources, that operations for the transactional resource executed successfully.

11. The system of claim 1, wherein the system is configured to concurrently maintain a predetermined maximum number of threads, each thread associated with computing resources from the one or more computers.

12. A method comprising:
   receiving, by an application framework, a program that defines a transaction having a plurality of operations to one or more respective transactional resources;
   generating, by the application framework, a respective sequence of reactive operators for each transactional resource in the transaction;
   initiating each respective sequence of reactive operators, including:
      storing transaction metadata in a subscription context for the sequence, evaluating the sequence of reactive operators in an upstream subscription flow ordering until evaluating an operator that connects to the transactional resource, and passing the subscription context for the sequence to each subsequent operator in the sequence, and evaluating the sequence of reactive operators in a downstream data flow ordering when the operator that connects to the transactional resource begins receiving data;

determining, by the application framework using a first thread, that one of the sequences has not completed;

in response to the determining that one of the sequences has not completed, relinquishing computing resources of the first thread;

receiving an indication that all of the sequences of reactive operators have completed;

determining whether none of the sequences of reactive operators failed; and in response to determining that none of the sequences of reactive operators failed, committing the operations of the transaction in each of the one or more transactional resources.

13. The method of claim 12, the operations further comprising:

in response to determining that at least one of the sequences of reactive operators failed, reverting the operations of the transaction in each of the one or more transactional resources.

14. The method of claim 12, wherein the program includes a special directive that directs the system to reactive transaction management for the operations of the transaction.

15. The method of claim 12, wherein the program that defines a transaction having a plurality of operations to one or more respective transactional resources comprises a reactive operator defining the transaction.

16. The method of claim 12, wherein the program defines the operations of the transaction using a callback function defined in the application framework, wherein executing the callback function identifies the transaction having the operations.

17. The method of claim 12, wherein the transaction metadata is immutable in the downstream data flow.

18. The method of claim 12, wherein determining that none of the sequences of reactive operators failed comprises receiving an indication, from each transactional resource in the one or more transactional resources, that operations for the transactional resource executed successfully.

19. The method of claim 12, wherein the system is configured to concurrently maintain a predetermined maximum number of threads, each thread associated with computing resources from the one or more computers.

20. One or more computer-readable storage media encoded with instructions that, when executed by one or more computers, cause the one or more computers to perform operations comprising:

receiving, by an application framework, a program that defines a transaction having a plurality of operations to one or more respective transactional resources;

generating, by the application framework, a respective sequence of reactive operators for each transactional resource in the transaction;

initiating each respective sequence of reactive operators, including:

storing transaction metadata in a subscription context for the sequence, evaluating the sequence of reactive operators in an upstream subscription flow ordering until evaluating an operator that connects to the transactional resource, and passing the subscription context for the sequence to each subsequent operator in the sequence, and evaluating the sequence of reactive operators in a downstream data flow ordering when the operator that connects to the transactional resource begins receiving data;

determining, by the application framework using a first thread, that one of the sequences has not completed;

in response to the determining that one of the sequences has not completed, relinquishing computing resources of the first thread;

receiving an indication that all of the sequences of reactive operators have completed;

determining whether none of the sequences of reactive operators failed; and in response to the determining that none of the sequences of reactive operators failed, committing the operations of the transaction in each of the one or more transactional resources.

21. The computer-readable storage media of claim 20, wherein the instructions further cause the one or more computers to perform operations comprising:

in response to determining that at least one of the sequences of reactive operators failed, reverting the operations of the transaction in each of the one or more transactional resources.

22. The computer-readable storage media of claim 20, wherein the program includes a special directive that directs the system to reactive transaction management for the operations of the transaction.

23. The computer-readable storage media of claim 20, wherein the program that defines a transaction having a plurality of operations to one or more respective transactional resources comprises a reactive operator defining the transaction.

24. The computer-readable storage media of claim 20, wherein the program defines the operations of the transaction using a callback function defined in the application framework, wherein executing the callback function identifies the transaction having the operations.

25. The computer-readable storage media of claim 20, wherein the transaction metadata is immutable in the downstream data flow.

26. The computer-readable storage media of claim 20, wherein determining that none of the sequences of reactive operators failed comprises receiving an indication, from each transactional resource in the one or more transactional resources, that operations for the transactional resource executed successfully.

27. The computer-readable storage media of claim 20, wherein the system is configured to concurrently maintain a predetermined maximum number of threads, each thread associated with computing resources from the one or more computers.

* * * * *